US006903782B2

(12) United States Patent
Herman et al.

(10) Patent No.: US 6,903,782 B2
(45) Date of Patent: Jun. 7, 2005

(54) SYSTEM AND METHOD FOR PERFORMING SEGMENTATION-BASED ENHANCEMENTS OF A VIDEO IMAGE

(75) Inventors: Stephen Herman, Monsey, NY (US); Johan G. Janssen, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 520 days.

(21) Appl. No.: 09/819,360

(22) Filed: Mar. 28, 2001

(65) Prior Publication Data

US 2002/0140864 A1 Oct. 3, 2002

(51) Int. Cl.[7] .................................................. H04N 5/14
(52) U.S. Cl. ...................... 348/625; 382/164; 382/274; 348/577; 348/597; 348/630; 348/649; 348/652; 348/687; 345/589; 345/611; 345/694
(58) Field of Search .................................. 382/164, 266, 382/274, 275; 348/135, 252, 592, 577, 603, 625, 630, 649, 650, 652, 682, 703, 717, 597, 687; 345/589, 590, 611, 613, 614, 694; H04N 5/14

(56) References Cited

U.S. PATENT DOCUMENTS

| 4,783,840 | A | * | 11/1988 | Song ............................ 382/261 |
| 5,040,064 | A | | 8/1991 | Cok |
| 5,387,946 | A | | 2/1995 | Knee |
| 5,412,563 | A | | 5/1995 | Cline et al. |
| 5,555,029 | A | * | 9/1996 | Kim ............................ 348/607 |
| 5,568,568 | A | * | 10/1996 | Takizawa et al. ............ 382/220 |
| 5,604,545 | A | * | 2/1997 | Chatterjee et al. .......... 348/671 |
| 5,781,198 | A | * | 7/1998 | Korn ............................ 345/634 |
| 5,825,917 | A | * | 10/1998 | Suzuki ........................ 382/164 |
| 5,915,044 | A | * | 6/1999 | Gardos et al. .............. 382/236 |
| 6,031,581 | A | * | 2/2000 | Harrington .................. 348/630 |
| 6,088,137 | A | | 7/2000 | Tomizawa |
| 6,094,205 | A | * | 7/2000 | Jaspers ........................ 348/625 |
| 6,115,078 | A | * | 9/2000 | Kino ............................ 348/625 |
| 6,184,926 | B1 | * | 2/2001 | Khosravi et al. ............ 348/239 |
| 6,288,703 | B1 | * | 9/2001 | Berman et al. .............. 345/600 |
| 6,343,141 | B1 | * | 1/2002 | Okada et al. ................ 382/118 |
| 6,476,820 | B1 | * | 11/2002 | Harada et al. ............... 345/589 |
| 6,529,637 | B1 | * | 3/2003 | Cooper ........................ 382/267 |
| 6,577,759 | B1 | * | 6/2003 | Caron et al. ................. 382/164 |
| 6,600,517 | B1 | * | 7/2003 | He et al. ..................... 348/625 |
| 6,704,448 | B1 | * | 3/2004 | Hasegawa .................... 382/173 |
| 6,714,688 | B1 | * | 3/2004 | Gallagher et al. ........... 382/266 |
| 6,718,063 | B1 | * | 4/2004 | Lennon et al. .............. 382/224 |
| 6,803,920 | B2 | * | 10/2004 | Gossett et al. .............. 345/591 |

(Continued)

FOREIGN PATENT DOCUMENTS

| EP | 0844582 A2 | 5/1997 |
| EP | 0902585 A2 | 3/1999 |

OTHER PUBLICATIONS

"A Region–Based Algorithm for Enhancement of Images Degraded by Blocking Effects", by Thomas Meier et al. XP 000781712.

"A Probabilistic Filter for Eliminating Temporal Noise in Time–Varying Image Sequences", by Adnan M. Alattar.

Primary Examiner—Brian P. Yenke (57) ABSTRACT

There is disclosed an apparatus for performing segmentation-based enhancements of a video image. The apparatus comprises: 1) an input buffer for storing video frames of an incoming video signal; 2) a segmentation controller capable of segmenting a first stored frame into a plurality of segments, each of the plurality of segments comprising a plurality of pixels having at least one common property; 3) an image processor capable of calculating a probability function associated with at least one pixel in the first stored frame, the probability function indicating a probability that the at least one pixel belongs within a first selected one of the plurality of segments; and 4) an enhancement controller capable of enhancing a parameter of the at least one pixel as a function of the probability function of the at least one pixel.

21 Claims, 4 Drawing Sheets

U.S. PATENT DOCUMENTS

| | | | |
|---|---|---|---|
| 6,832,000 B2 * | 12/2004 | Herman et al. | 382/165 |
| 6,839,463 B1 * | 1/2005 | Blake | 382/173 |
| 2001/0001020 A1 * | 5/2001 | Mizuno | 382/282 |
| 2002/0106122 A1 * | 8/2002 | Messing et al. | 382/162 |
| 2002/0131638 A1 * | 9/2002 | He et al. | 382/197 |
| 2002/0140815 A1 | 10/2002 | Herman et al. | |
| 2003/0002732 A1 * | 1/2003 | Gossett et al. | 382/164 |
| 2003/0071924 A1 * | 4/2003 | Yamazaki et al. | 348/687 |
| 2003/0194126 A1 * | 10/2003 | Shin et al. | 382/164 |

* cited by examiner

SYSTEM AND METHOD FOR PERFORMING SEGMENTATION-BASED ENHANCEMENTS OF A VIDEO IMAGE

TECHNICAL FIELD OF THE INVENTION

The present invention is directed to an apparatus and method for enhancing a video signal and, more specifically, to an apparatus and method for selectively applying continuously varying amounts of video enhancement to groups of pixels based on a probability function.

BACKGROUND OF THE INVENTION

The television industry is undergoing significant changes as a result of the transition from the current standard definition television (SDTV) to high definition television (HDTV). Much of this change is driven by the FCC requirement that all broadcasters in the United States must transmit all programming content as HDTV signals and must cease transmitting SDTV signals by the year 2006. As a result, high definition televisions are becoming increasingly available in the marketplace, as are HDTV conversion systems that convert an HDTV signal to an SDTV image for display on a standard definition television.

Some of the driving forces behind the transition to HDTV are the possibility of a larger and clearer picture, the changed aspect ratio (similar to movie format) in some systems, and the decreased susceptibility of the digital signal to noise during transmission to the viewer. As screens grow larger, viewers expect increased resolution. For a number of years to come, however, HDTV sets must be able to receive and display television signals according to the existing SDTV standard (e.g., PAL, NTSC, SECAM) while broadcast facilities are making the transition to the new HDTV standard (ATSC). In the interim, it is highly desirable that an HDTV set be able to display an SDTV signal at increased resolution to create the subjective impression of a high definition television image. In addition, from the broadcast side, techniques are needed which can up-convert existing standard definition (SD) materials into high definition (HD) format.

Unfortunately, the resolution of the video signal at the television receiver is limited by the quality of the original video signal (e.g., PAL, NTSC, SECAM) or the bandwidth of the transmission channel. Therefore, in order to increase the resolution of the SDTV signals for better perceptual quality, post-processing the video signal in the receiver after demodulation becomes increasingly important.

Segmentation of television images is a post-processing technique wherein each frame of an image sequence is subdivided into regions or segments. Each segment is a cluster of pixels encompassing a region of the image with a commonality of properties. For example, a segment may be distinguished by a common color, a common texture, a particular shape, an amplitude range or a temporal variation. Known early applications of segmentation include pattern recognition, target tracking, and security surveillance. Most recent research into segmentation has been in applications related to the MPEG-4 and MPEG-7 standards. In the former case, segments are identified and uniquely encoded to achieve date compression. In the case of MPEG-7, segmentation is used to identify image components for image classification and retrieval.

In the case of television image enhancement, known enhancement techniques include both global and local enhancement methods. Examples of global enhancement techniques may include the brightness and contrast controls of television (TV) receivers that control the DC offset and signal gain globally (or uniformly) over the entire image. An example of a local control enhancement technique is edge enhancement, in which an image processor automatically detects the location of edges in the image and applies appropriate enhancement only in the local region of the edge.

Although local enhancement techniques are applied only to local regions of an image, the conventional methods are nonetheless controlled by global parameters. In the case of edge enhancement, for example, the edge enhancement algorithm may adapt to the local edge characteristics. However, the parameters that govern the algorithm are global (i.e., they are the same for every region of the image). The use of global parameters places a limitation on the most effective enhancement that can be applied to any given image. A greater amount of enhancement would be available if the enhancement algorithm could be trained to recognize the features depicted in different segments of the image and could dynamically choose image enhancement parameters that are optimized for each type of image feature.

The known methods of image segmentation may be described as "hard" segmentation in that a binary decision is made. Every region either satisfies the relative criteria of a segment and is included in the desired segment, or it is completely excluded. Many conventional hard segmentation techniques are satisfactory for the applications that have been published in the prior art. However, these hard segmentation techniques are not satisfactory in many advanced applications.

For example, in the case of applying hard segmentation techniques to moving image sequences, small changes in appearance, lighting or perspective may only cause small changes is the image. The result is often that parts of the image satisfy or fail the hard segmentation criteria in a random way from image frame to image frame. When image enhancement techniques are applied exclusively to the segmented regions, the result may be random variations in the enhancement, usually at the edges of the segmented regions. Such random variations in moving sequences represent disturbing artifacts that are not acceptable to the viewers.

There is therefore a need in the art for improved apparatuses and methods for enhancing the quality of a television image. In particular, there is a need in the art for improved image enhancement techniques that are not affected by small variations in appearance, lighting, perspective, and the like between successive frames in a video image. More particularly, there is a need for improved apparatuses and methods of segmenting and enhancing a video image that do not rely on hard, binary decisions regarding whether or not to apply an enhancement technique or a segmenting technique to a pixel or group of pixels in an image.

SUMMARY OF THE INVENTION

To address the above-discussed deficiencies of the prior art, it is a primary object of the present invention to provide an apparatus for performing segmentation-based enhancements of a video image. According to an advantageous embodiment of the present invention, the apparatus comprises: 1) an input buffer for storing video frames of an incoming video signal; 2) a segmentation controller capable of segmenting a first stored frame into a plurality of segments, each of the plurality of segments comprising a plurality of pixels having at least one common property; 3) an image processor capable of calculating a probability function associated with at least one pixel in the first stored frame, the probability function indicating a probability that the at least one pixel belongs within a first selected one of the plurality of segments; and 4) an enhancement controller capable of enhancing a parameter of the at least one pixel as a function of the probability function of the at least one pixel.

According to one embodiment of the present invention, the segmentation controller segments the first stored frame into the plurality of segments as a function of the probability function.

According to another embodiment of the present invention, the enhancement controller increases an amount of enhancement of the parameter as a value of the probability function increases.

According to still another embodiment of the present invention, the enhancement controller decreases an amount of enhancement of the parameter as a value of the probability function decreases.

According to yet another embodiment of the present invention, the apparatus further comprises a memory capable of storing a segmentation algorithm, the segmentation algorithm comprising instructions executable by the segmentation controller for segmenting the first stored frame into the plurality of segments.

According to further embodiment of the present invention, the memory is further capable of storing an enhancement algorithm, the enhancement algorithm comprising instructions executable by the enhancement controller for enhancing the parameter of the at least one pixel.

According to still further embodiment of the present invention, the probability function associated with at least one pixel is calculated from the (y, u, v) color values associated with the at least one pixel.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments set forth in this patent document to describe the principles of the apparatus and method of the present invention are by way of illustration only and should not be construed in any way to limit the scope of the invention. Those skilled in the art will understand that the principles of the present invention may be implemented in any suitably arranged video processing system, including, without limitation, television receivers, television broadcast systems, personal computers (PCs) containing advanced video processing circuits and related video processing software, and the like. In the descriptions that follow, a video image sharpening apparatus according to the present invention is implemented in a television set and in a personal computer (PC) for illustration purposes only.

Figure 1:
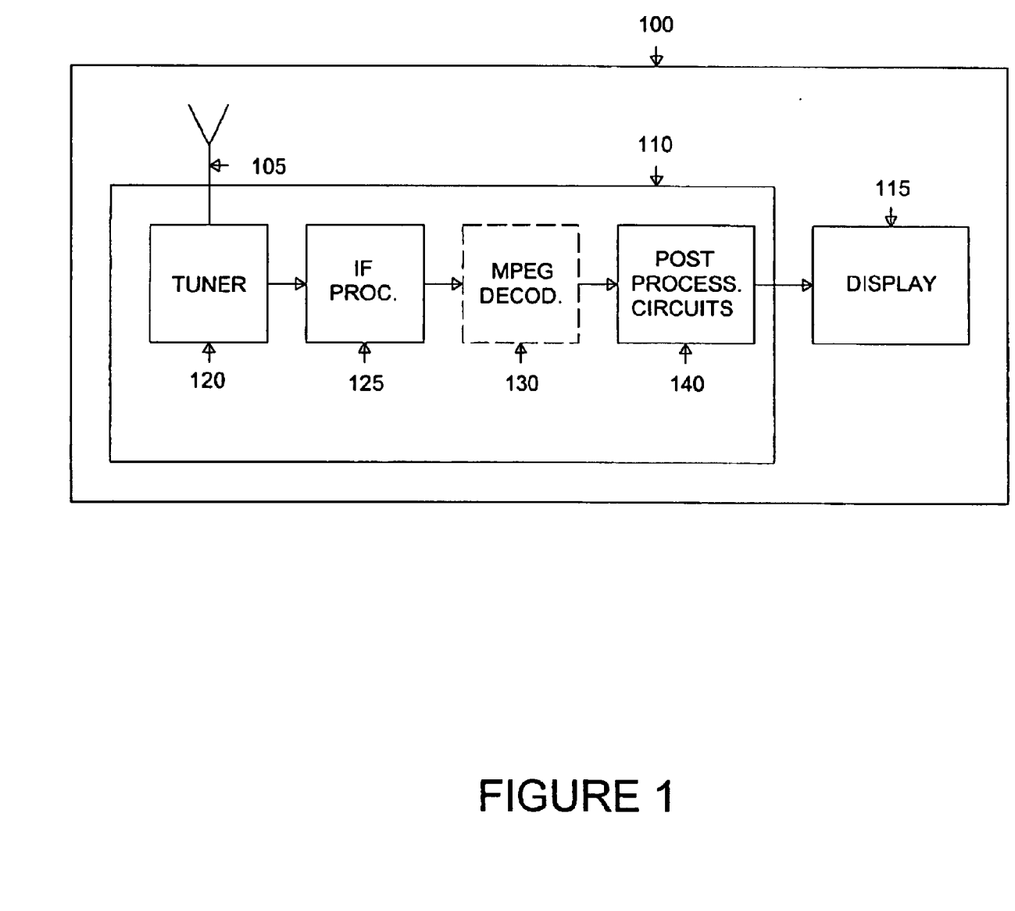
FIG. 1 is a block diagram of a television set that contains an apparatus for segmenting and enhancing a video image according to principles of the present invention.

FIG. 1 is a block diagram of television set 100, which contains an apparatus for segmenting and enhancing a video image according to principles of the present invention. Television set 100 comprises antenna 105, television receiver 110, and display unit 115. Antenna 105 receives incoming radio frequency (RF) television signals that are processed by television receiver 110. Display unit 115 may be, for example, a cathode ray tube, a flat panel display, or any other type of equipment for displaying video images.

Television receiver 110 comprises tuner 120, intermediate frequency (IF) processor 125, optional MPEG decoder 130, and post-processing circuitry 140. MPEG decoder 130 (shown in dotted lines) is optional in the exemplary embodiment because television receiver 110 may be an analog television receiver that does not contain an MPEG decoder. In such an embodiment, the output of IF processor 125 is used directly by post-processing circuitry 140. Tuner 120 down-converts the incoming RF signal to produce an intermediate frequency (IF) signal. The IF output of tuner 120 is further down-converted by IF processor 125 to produce a baseband signal that may be, for example a transport stream. MPEG decoder 130 may comprise a demultiplexer circuit that extracts from the transport stream at least one elementary stream, such as an MPEG-encoded data stream. MPEG decoder 130 then converts the encoded MPEG data stream and generates a standard video signal capable of being displayed by display unit 115. However, in order to further improve the quality of the video signal generated by MPEG decoder 130, the output of MPEG decoder 130 is transferred to post-processing circuitry 140 for additional processing. The improved video signal at the output of post-processing circuitry 140 is then transmitted to display unit 115.

Post-processing circuitry 140 is capable of carrying out several different types of video signal processing. Exemplary video signal processing functions performed by post-processing circuitry 140 may include: noise reduction algorithms, color correction, scaling, scan-rate conversion, adaptive feature enhancement, and other adaptive object based algorithms. In an advantageous embodiment, post-processing circuitry 140 comprises segmentation circuitry and color enhancing circuitry capable of performing soft segmentation and adaptive color enhancement according to the principles of the present invention.

Figure 2:
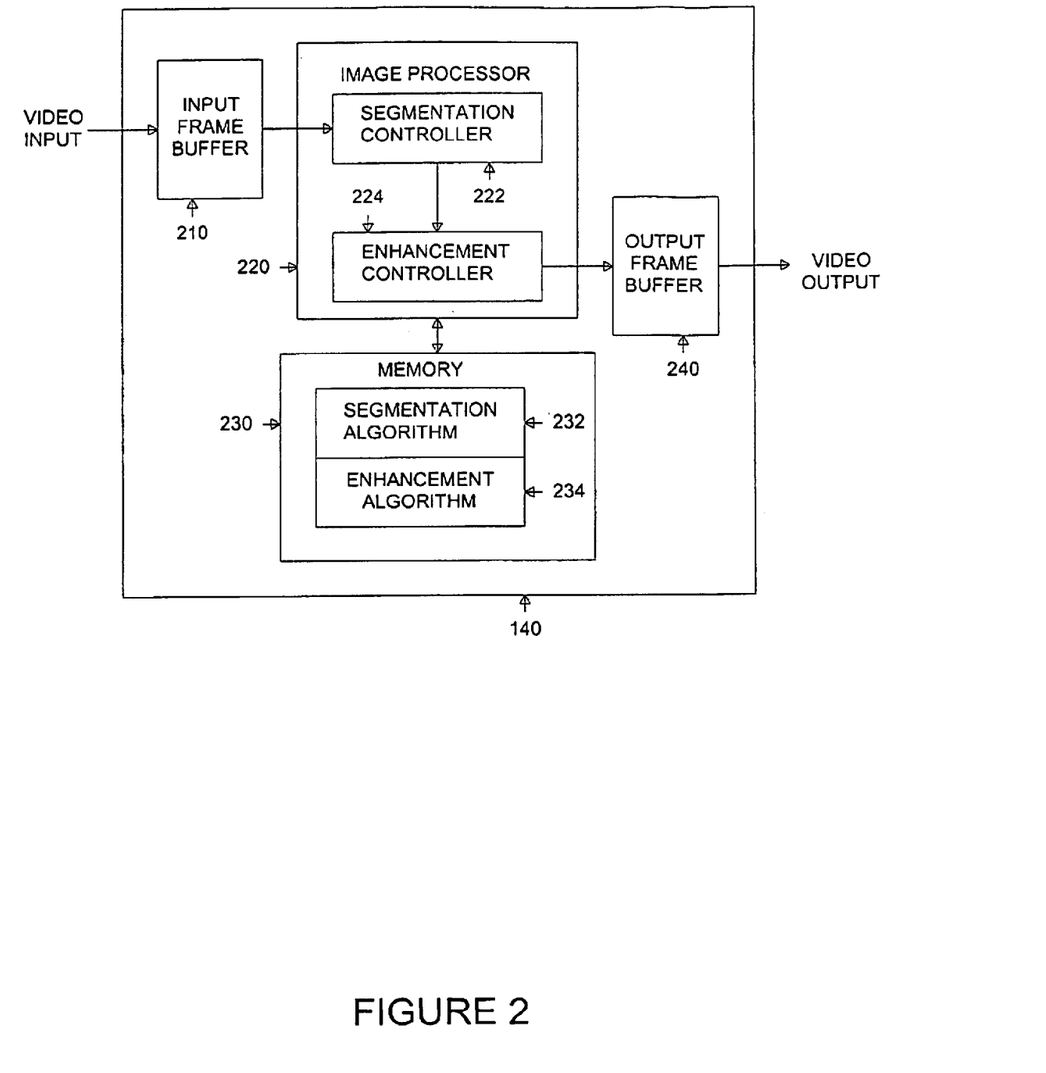
FIG. 2 illustrates the post-processing circuitry in the exemplary television set in greater detail according to one embodiment of the present invention.

FIG. 2 illustrates post-processing circuitry 140 in greater detail according to one embodiment of the present invention. Post-processing circuitry 140 comprises input frame buffer 210, image processor 220, memory 230, and output frame buffer 240. Post-processing circuitry 140 receives incoming video frames from optional MPEG decoder 130 or IF processor 125 (as the case may be) and stores the pixel data of each video frame in input frame buffer 210. Next, image processor 220 performs soft segmentation of each video frame (as explained below in greater detail) in accordance with the principles of the present invention.

Segmentation controller 222 comprises the portions of image processor 220 that are capable of performing soft image segmentation. According to an advantageous embodiment of the present invention, segmentation controller 222 performs segmentation by executing instructions stored in segmentation algorithm 232 in memory 230. Enhancement controller 224 comprises the portions of image processor 220 that are capable of performing one or more types of image segmentation (i.e., color shifting, increasing color saturation, edge enhancing, and the like). According to an advantageous embodiment of the present invention, enhancement controller 222 performs these image enhancement techniques by executing instructions stored in enhancement algorithm 234 in memory 230. The segmented and enhanced video frames are then stored in output farm buffer 240 for subsequent transfer to display 115.

It was noted above that the present invention may be implemented in any suitably arranged image processing system, including personal computers containing advanced video processing circuits and related video processing software. This being the case, the present invention may be implemented as computer-executable instructions and data stored on the hard disk drive of a PC or on removable storage medium, which may be for example, a CD-ROM disk, a DVD disk, a 3.5 inch floppy disk, or the like.

Figure 3:
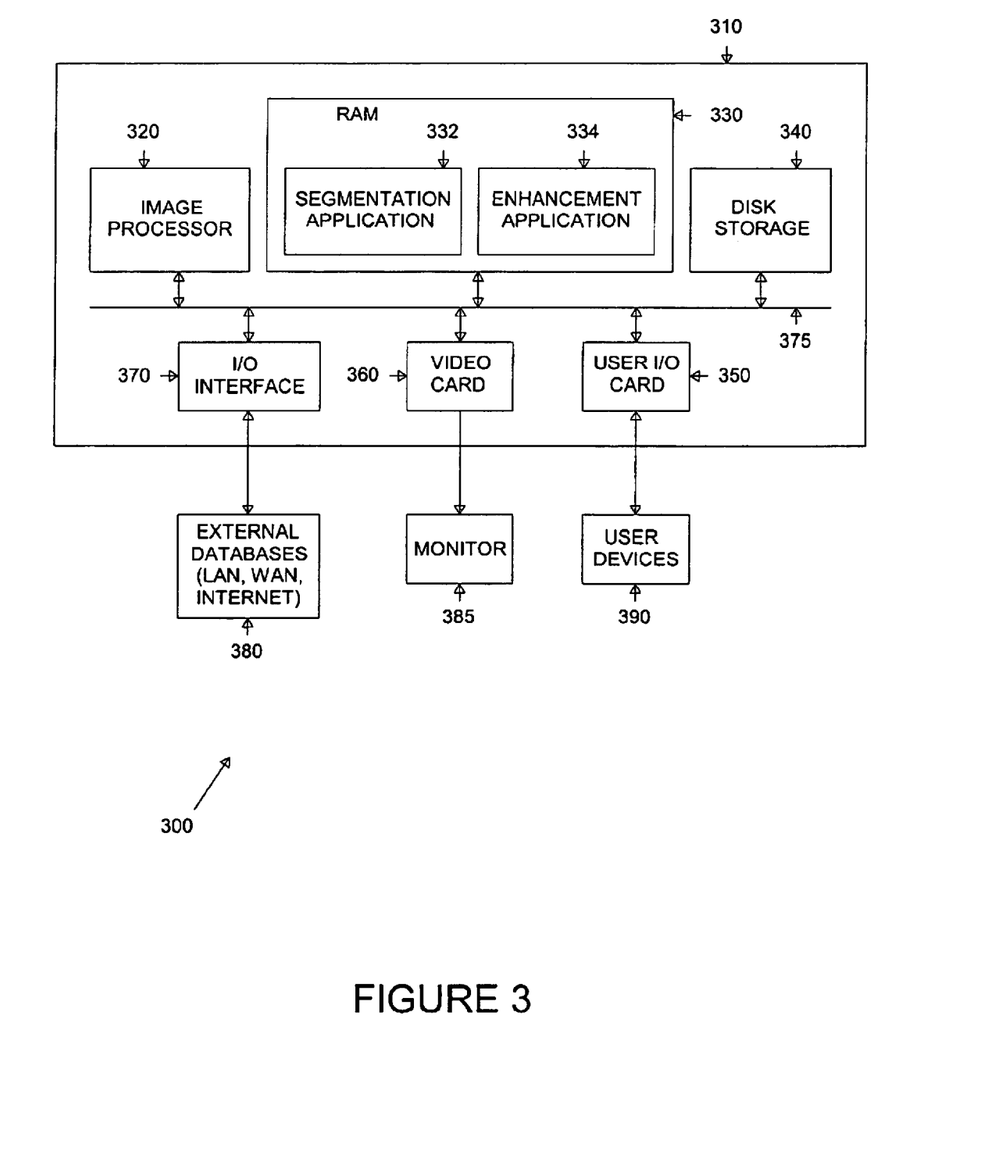
FIG. 3 illustrates an exemplary PC-based image processing system in accordance with one embodiment of the present invention.

FIG. 3 illustrates exemplary image processing system 300 in accordance with one embodiment of the present invention. Image processing system 300 comprises personal computer (PC) 310, external databases 380, monitor 385, and user devices 390. Personal computer 310 performs segmentation and enhancement of video frames retrieved from video files. External databases 380 comprise one or more sources from which digitized video images may be retrieved. These databases may be provided through access with a local area network (LAN), wide area network (WAN), Internet, and/or other sources such as direct access to data through external devices such as tape, disk, or other storage devices.

Monitor 385 displays the enhanced video images. User device(s) 390 represents one or more peripheral devices that may be manipulated by the user of image processing system 300 to provide user inputs for the system. Typical peripheral user input devices include a computer mouse, a keyboard, a light pen, a joystick, a touch-table and associated stylus, or any other device that may selectively be used to enter, to select, and to manipulate data, including all or portions of the retrieved image(s). User device(s) 390 may also include output devices, such as a color printer, which can be utilized to capture a particular retrieved or modified image.

Personal computer 310 comprises image processor 320, random access memory (RAM) 330, disk storage 340, user input/output (I/O) card 350, video card 360, I/O interface 370, and processor bus 375. RAM 330 further comprises image segmentation application 332 and image enhancement application 334. Processor bus 375 transfers data between all of the components of personal computer 110. Image processor 320 provides over-all control for personal computer 110 and performs soft segmentation of video images according to the principles of the present invention. Image processor 320 also performs color enhancement, edge sharpening and other enhancements in accordance with the principles of the present invention. The requirements and capabilities for image processor 320 are well known in the art and need not be described in greater detail other than as required for the present invention.

RAM 330 provides random access memory for temporary storage of data produced by personal computer 310, which is not otherwise provided by components within the system. RAM 330 includes memory for segmentation application 332, enhancement application 334, as well as other memory required by image processor 320 and associated devices. Segmentation application 332 represents the portion of RAM 330 in which the initial video image and any modified region-based images are temporarily stored during the soft segmentation process. Segmentation application 332 comprises executable instructions that define and segment regions and shapes of the same color, the same texture, a particular shape, an amplitude range or a temporal variation. Enhancement application 334 comprises executable instructions in an application program executed by image processor 320 that perform different types of enhancements on the segments defined by segmentation application 334. Segmentation application 332 and enhancement application 334 may also be embodied as a program on a CD-ROM, computer diskette, or other storage media that may be loaded into a removable disk port in disk storage 340 or elsewhere, such as in external databases 380.

Disk storage 340 comprises one or more disk systems, including a removable disk, for permanent storage of application programs, including segmentation application 332 and enhancement application 334, and other data. User I/O card 350 is an interface between user device(s) 390 and the rest of personal computer 310. Video card 360 provides the interface between monitor 385 and the rest of personal computer 310 and I/O interface 370 provides an interface between external databases 380 and the rest of personal computer 310.

The present invention combines segmentation and local enhancement to provide new enhancement functionality that has not been available in the prior art. For example, consider images featuring vegetation such as grass, trees and other green plants. The present invention includes an algorithm that recognizes all regions of each image that consists of green plants. The present invention then applies image processing deemed optimum to green plants to these regions only. Other parts of the image would get enhancement treatments uniquely optimized for their features.

The present invention introduces the concept of soft segmentation, which defines a continuous (i.e., non-binary) function that models the probability that a range of pixels lies within a desired segment. Such segments could be predefined pixel value ranges for the colors and textures of, for example, plants, sky, human skin, and the like. Segments are defined according to the probability that a group of pixels are part of the same segment.

After the segments are defined, the amount of enhancement that is applied is also a function of the probability measurement. The greater the probability that a pixel lies within a segment, the greater the amount of enhancement that is applied to that pixel. Maximum enhancement is applied where the probability is maximum. Since the probability is lower near the edges of a segment, the enhancement fades out gracefully at the edges of the segment. This allows for such segmentation-based enhancements to be applied to moving images without the frame-to-frame artifacts attributed to hard (or binary) segmentation.

According to an advantageous embodiment of the present invention, one suitable probability model for many soft segmentation tasks is the Gaussian distribution. However, the efficacy of the soft segmentation model would hold for other mathematical distribution functions as well. According to one embodiment of the present invention, a probability function may be defined in the hue-saturation-value (HSV) color space or in the YUV color space. While the invention covers the use of these or any other color space for specifying color properties, the YUV color space is especially desirable, since TV signals are already available in YUV form and no further transformation to another color space is required. A three dimensional Gaussian distribution function may be used to model the probability for soft segmentation. This function is in the form of:

$$P(y,u,v)=e^z,$$

where $$Z=(-A^2+B^2+C^2);$$
$$A=(y-y_{MID})/\sigma_y;$$
$$B=(u-u_{MID})/\sigma_u;$$
$$C=(v-v_{MID})/\sigma_v,$$

for $0<y<255$, $0<u<255$, $0<v<255$.

A set of exemplary parameter values may comprise:
$y_{MID}=102$
$u_{MID}=106$
$v_{MID}=108$
$\sigma_y=89$
$\sigma_u=19$
$\sigma_v=19$ In the case of plant segments, an exemplary enhancement algorithm may shift the color of the plant segment toward the color of bright green grass, increase the color saturation, increase the luminance and apply edge enhancement. The amount of enhancement that is applied is proportional to the probability function. The concepts described here are not restricted to the plant segmentation given as a sample application. Other regions such as sky, human skin, buildings, and the like may require different probability functions and different parameter values.

Figure 4:
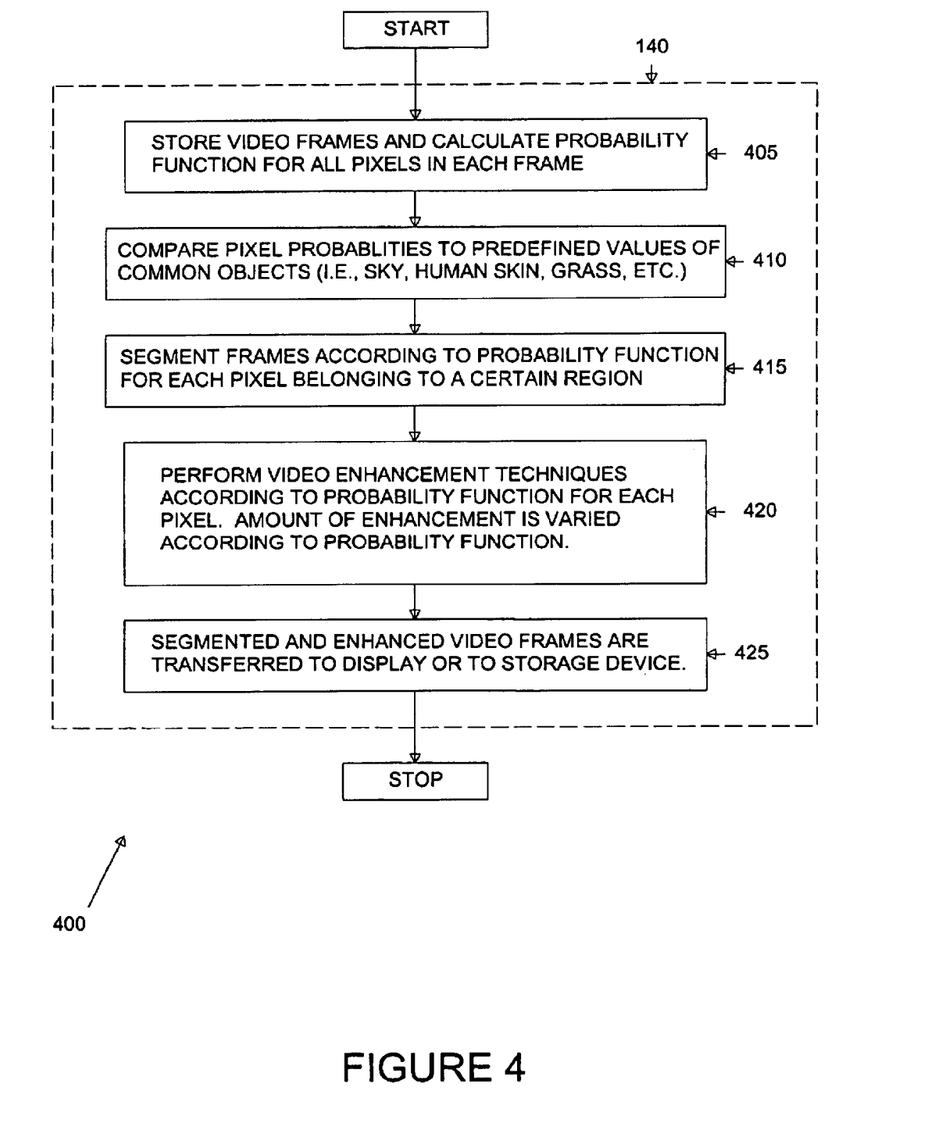
FIG. 4 is a flow diagram illustrating the operation of the selected portions of post processing circuitry according to one embodiment of the present invention.

FIG. 4 depicts flow diagram 400, which illustrates the operation of selected portions of post-processing circuitry 140 according to one embodiment of the present invention. During routine operation, post-processing circuitry 140 receives video frames from MPEG decoder 130 and stores them in input frame buffer 210. Image processor 220 then calculates the probability function described above for all pixels in each frame (process step 405). Next, image processor 220 performs segmentation by comparing the pixel probabilities to predefined values of common objects, such as the sky, different types of human skin, grass, and the like (process step 410). Groups of pixels that compare favorably with the predefined values are identified as belonging in a common segment. Alternatively, other known prior art segmentation techniques may be used in addition to, or in place of, segmentation based on the above-described probability function (process step 415).

Once the frames are segmented, image processor 220 performs one or more video enhancement techniques on the segmented vide frames according to the probability function associated with each pixel. According to the principles of the present invention, the amount of enhancement is proportional to the probability function (process step 420). That is, if a pixel has a relatively high probability of belonging to a certain segment, then a relatively greater amount of enhancement is applied. Conversely, if a pixel has a relatively low probability of belonging to a certain segment, then a relatively smaller amount of enhancement is applied. For example, the green pixels within the boundaries of a palm leaf that is defined as a region have a greater probability value than pixels near the edge, which may be transitioning to another color as the palm leaf moves. Thus, a color enhancement technique that increases the green coloration of the palm leaf would apply a greater amount of color enhancement near the center of the palm leaf than at the edge of the palm leaf. Finally, the segmented and enhanced video frames are transferred to display 115 or, alternatively, to a storage device in a personal computer embodiment of the present invention.

Although the present invention has been described in detail, those skilled in the art should understand that they can make various changes, substitutions and alterations herein without departing from the spirit and scope of the invention in its broadest form.

What is claimed is:

1. An apparatus for performing segmentation-based enhancements of a video image, said apparatus comprising:
   an input buffer for storing video frames of an incoming video signal;
   a segmentation controller capable of segmenting a first stored frame into a plurality of segments, each of said plurality of segments comprising a plurality of pixels having at least one common property;
   an image processor capable of calculating a probability function associated with at least one pixel in said first stored frame, said probability function indicating a probability that said at least one pixel belongs within a first selected one of said plurality of segments; and
   an enhancement controller capable of enhancing a parameter of said at least one pixel as a function of said probability function of said at least one pixel.

2. The apparatus as set forth in claim 1 wherein said segmentation controller segments said first stored frame into said plurality of segments as a function of said probability function.

3. The apparatus as set forth in claim 2 wherein said enhancement controller increases an amount of enhancement of said parameter as a value of said probability function increases.

4. The apparatus as set forth in claim 3 wherein said enhancement controller decreases an amount of enhancement of said parameter as a value of said probability function decreases.

5. The apparatus as set forth in claim 1 further comprising a memory capable of storing a segmentation algorithm, said segmentation algorithm comprising instructions executable by said segmentation controller for segmenting said first stored frame into said plurality of segments.

6. The apparatus as set forth in claim 5 wherein said memory is further capable of storing an enhancement algorithm, said enhancement algorithm comprising instructions executable by said enhancement controller for enhancing said parameter of said at least one pixel.

7. The apparatus as set forth in claim 1 wherein said probability function associated with at least one pixel is calculated from the (y,u,v) color values associated with said at least one pixel.

8. A television receiver comprising:
   demodulation circuitry capable of receiving an incoming RF television signal and generating therefrom a baseband video signal capable of being displayed as a plurality of pixels on a video display; and
   post processing circuitry, coupled to an output of said demodulation circuitry and receiving therefrom said baseband video signal, capable of performing segmentation-based enhancements of a video image, said post processing circuitry comprising:
      an input buffer for storing video frames of an incoming video signal;
      a segmentation controller capable of segmenting a first stored frame into a plurality of segments, each of said plurality of segments comprising a plurality of pixels having at least one common property;
      an image processor capable of calculating a probability function associated with at least one pixel in said first stored frame, said probability function indicating a probability that said at least one pixel belongs within a first selected one of said plurality of segments; and
      an enhancement controller capable of enhancing a parameter of said at least one pixel as a function of said probability function of said at least one pixel.

9. The television receiver as set forth in claim 8 wherein said segmentation controller segments said first stored frame into said plurality of segments as a function of said probability function.

10. The television receiver as set forth in claim 9 wherein said enhancement controller increases an amount of enhancement of said parameter as a value of said probability function increases.

11. The television receiver as set forth in claim 10 wherein said enhancement controller decreases an amount of enhancement of said parameter as a value of said probability function decreases.

12. The television receiver as set forth in claim 8 further comprising a memory capable of storing a segmentation algorithm, said segmentation algorithm comprising instructions executable by said segmentation controller for segmenting said first stored frame into said plurality of segments.

13. The television receiver as set forth in claim 12 wherein said memory is further capable of storing an enhancement algorithm, said enhancement algorithm comprising instructions executable by said enhancement controller for enhancing said parameter of said at least one pixel.

14. The television receiver as set forth in claim 8 wherein said probability function associated with at least one pixel is calculated from the (y,u,v) color values associated with said at least one pixel.

15. A method of performing segmentation-based enhancements of a video image comprising the steps of:
   storing video frames of an incoming video signal in an input buffer;
   segmenting a first stored frame into a plurality of segments, each of the plurality of segments comprising a plurality of pixels having at least one common property;
   calculating a probability function associated with at least one pixel in the first stored frame, the probability function indicating a probability that the at least one pixel belongs within a first selected one of the plurality of segments; and
   enhancing a parameter of the at least one pixel as a function of the probability function of the at least one pixel.

16. The method as set forth in claim 15 wherein the step of segmenting segments the first stored frame into the plurality of segments as a function of the probability function.

17. The method as set forth in claim 16 wherein the step of enhancing increases an amount of enhancement of the parameter as a value of the probability function increases.

18. The method as set forth in claim 17 wherein the step of enhancing decreases an amount of enhancement of the parameter as a value of the probability function decreases.

19. Computer-executable instructions stored on a computer-readable storage medium and capable of performing segmentation-based enhancements of a video image, the computer-executable instructions comprising the steps of:
   storing video frames of an incoming video signal in an input buffer;
   segmenting a first stored frame into a plurality of segments, each of the plurality of segments comprising a plurality of pixels having at least one common property;
   calculating a probability function associated with at least one pixel in the first stored frame, the probability function indicating a probability that the at least one pixel belongs within a first selected one of the plurality of segments; and
   enhancing a parameter of the at least one pixel as a function of the probability function of the at least one pixel.

20. The computer-executable instructions stored on a computer-readable storage medium as set forth in claim 19 wherein the step of segmenting segments the first stored frame into the plurality of segments as a function of the probability function.

21. The computer-executable instructions stored on a computer-readable storage medium as set forth in claim 20 wherein the step of enhancing increases an amount of enhancement of the parameter as a value of the probability function increases.

* * * * *